(No Model.)

J. F. DILL & S. A. ROTE.
PIPE COUPLING.

No. 396,550. Patented Jan. 22, 1889.

Witnesses.
Harry S. Rohrer
Wallace Dunn

Inventors,
John F. Dill,
S. A. Rote,
by Schuyler Duryea
Attorney

UNITED STATES PATENT OFFICE.

JOHN FRANK DILL AND SAMUEL A. ROTE, OF RIDGWAY, PENNSYLVANIA.

PIPE-COUPLING.

SPECIFICATION forming part of Letters Patent No. 396,550, dated January 22, 1889.

Application filed August 6, 1888. Serial No. 282,114. (No model.)

*To all whom it may concern:*

Be it known that we, JOHN FRANK DILL and SAMUEL A. ROTE, of Ridgway, in the county of Elk and State of Pennsylvania, have invented a certain new and useful improvement in couplings for steam, water, gas, and air pipes where the screw mode of making the connection is used; and we do hereby declare the following to be a full and exact description of the construction and operation of the same, reference being had to the accompanying drawings and letters of reference marked thereon, the same letters referring to like parts.

Our invention relates to an improvement in pipe-couplings adapted to couple steam and air pipes between railroad-cars, and for other analogous purposes; and it consists in the peculiar construction and combination of devices that will be more fully set forth hereinafter, and specifically pointed out in the appended claim.

The objects of our invention are to provide a cheap and simple pipe-coupling, which can be readily operated without the use of tongs or wrenches, and which shall be strong and durable, thoroughly efficient, and not likely to get out of order.

Figure 1:
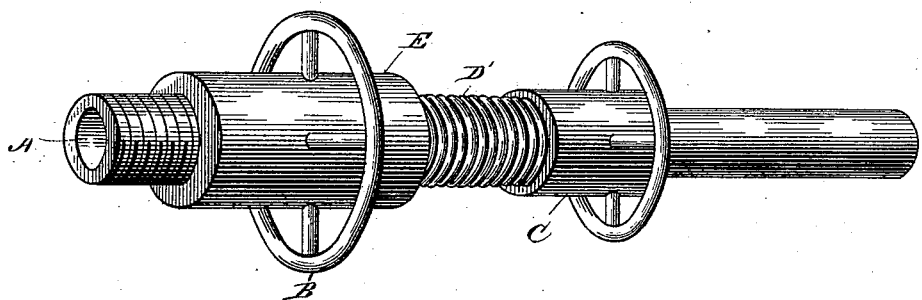
Figure 2:
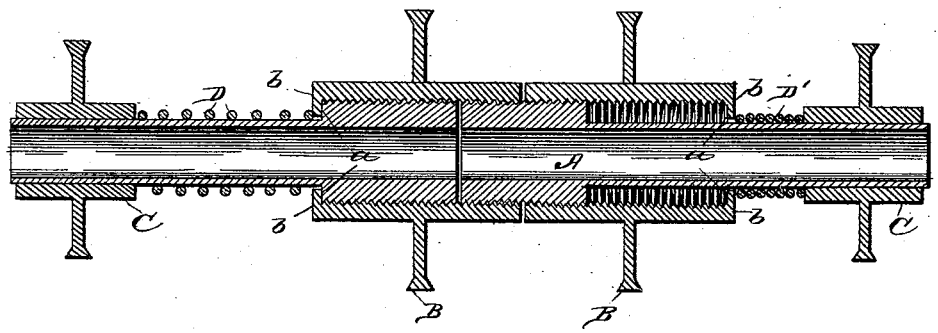

In the accompanying drawings, Figure 1 is a perspective view of one member of our improved coupling. Fig. 2 is a longitudinal sectional view of a pair of such members coupled together.

The members of the coupling are duplicates; hence it will only be necessary to describe one of them in the specification.

A represents a pipe of suitable length, which has its outer end enlarged slightly in diameter and provided with an exterior screw-thread. A shoulder, *a*, is thereby formed at the inner end of the threaded portion of the pipe.

E represents a sleeve or nut which is tubular in form, provided with an interior screw-thread adapted to engage the threaded end of the pipe A, and at the inner end of the said nut or sleeve is an annular inwardly-extending shoulder, *b*, adapted to come in contact with the shoulder *a*, and thereby prevent the nut from working forward off the threaded end of the pipe. The nut or sleeve is provided with a hand-wheel, B, by means of which it may be readily turned and worked forward or rearward on the pipe, as will be understood.

C represents a collar, which is shrunk on the pipe at a suitable distance from its threaded extremity, and is provided with a hand-wheel, by means of which the pipe may be readily held or rotated.

D represents a coiled extensile spring, which is arranged on the pipe A, and bears between the opposing ends of the nut or sleeve B and the collar C, the function of the spring being to normally force the sleeve or nut outward and prevent it from working toward the collar.

In order to effect a coupling, the two pipes A are arranged with their outer ends in contact. One of the nuts or sleeves is run inward on its pipe against the tension of its spring D, and the other nut or sleeve is run outward on its pipe and caused to engage the threaded portion of the opposing pipe, and thereby lock the pipes together. The two nuts or sleeves are jammed together to add to the security of the joints. The springs prevent the nuts from working apart and loosening the joint between the pipes.

Having thus described our invention, we claim and desire to secure by Letters Patent of the United States—

The combination of the pipes A, having the threaded portions at their meeting ends and having the shoulders *a*, the collars C, secured to said pipes, the interiorly-threaded sleeves or nuts E, engaging the threaded portions of the pipes and having the shoulders *b* at their inner ends, for the purpose set forth, one of said sleeves or nuts engaging both pipes and serving to couple the same, and the other nut being jammed against the coupling-nut, and the coiled extensile springs arranged on the pipes and bearing between the collars C and the sleeves or nuts, substantially as described.

JOHN FRANK DILL.
SAMUEL A. ROTE.

Witnesses:
I. D. BELL,
N. T. ARNOLD.